July 19, 1927.

J. F. CAVANAGH 1,636,588

STEERING GEAR STABILIZER

Filed Sept. 8, 1926

Inventor:
John F. Cavanagh
By Pennington and White
Attorneys.

Patented July 19, 1927.

1,636,588

UNITED STATES PATENT OFFICE.

JOHN F. CAVANAGH, OF PROVIDENCE, RHODE ISLAND, ASSIGNOR TO APCO MANUFACTURING COMPANY, OF PROVIDENCE, RHODE ISLAND, A CORPORATION OF RHODE ISLAND.

STEERING-GEAR STABILIZER.

Application filed September 8, 1926. Serial No. 134,259.

This invention relates to an improved stabilizing device for the steering-gear of automobiles.

The principal object of the invention is to provide a device for steadying the steering-knuckles of the front wheels of the automobile to resist unwarranted movement thereof under road shocks, whereby to prevent wobbling or "shimmying."

Another object of the invention is to provide a device of the type specified for taking up play between the parts of the steering-gear whereby to prevent lost motion and rattling at the joints.

Another object of the invention is to provide a device of the type specified which is simple in construction, economical to manufacture, proof against derangement or getting out of order and durable in use over long periods.

Another object of the invention is to provide a device of the type specified which may be attached to the steering-gear without the use of tools and without requiring added screws, bolts, nuts or other fastening means to hold it in place.

Further objects of the improvement are set forth in the following specification which describes a preferred embodiment of the invention as illustrated in the accompanying drawings. In the drawings.

Figure 1:
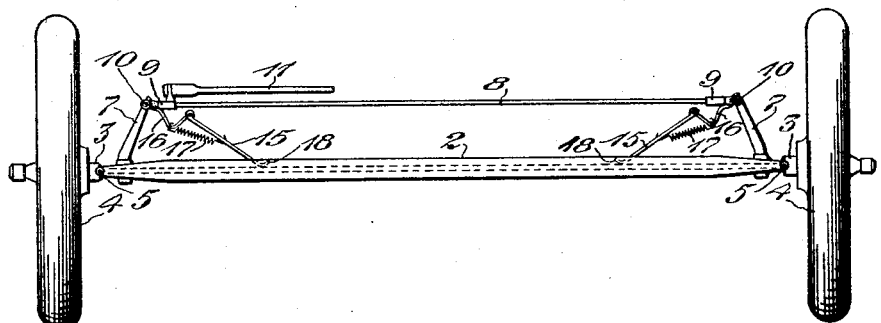
Fig. 1 is a plan view of the front axle of an automobile of the Ford type showing the steering-knuckles pivoted to the ends thereof and illustrating the improved device as applied to use therewith.
Figure 4:
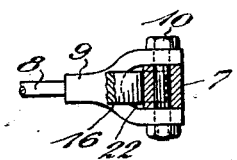
Fig. 4 is a detailed view showing the manner in which the device is engaged with the tie-rod and its connected steering-knuckle arm.

Referring first to Fig. 1 of the drawings, 2 designates the front axle of the automobile which is usually constructed of double channel iron of the I-beam type. The steering-knuckles 3 which carry the spindles for the front wheels 4 are pivoted at 5 to the ends of the axle 2 and are provided with rearwardly-projecting steering-arms 7. Extending between the ends of the steering-arms 7 is a connecting-link or tie-rod 8. The tie-rod 8 has forked bearing-members 9 at its extremities which straddle the ends of the steering-arms 7 and are pivotally connected thereto by means of bolts 10, see Fig. 4. A rod or drag-link 11, see Fig. 1, is connected to the tie-rod 8 adjacent its point of connection to one of the steering-arms 7 and extends to the steering-gear proper, not herein shown, through which the front wheels of the automobile are controlled from the steering-wheel at the driver's station.

Figure 2:
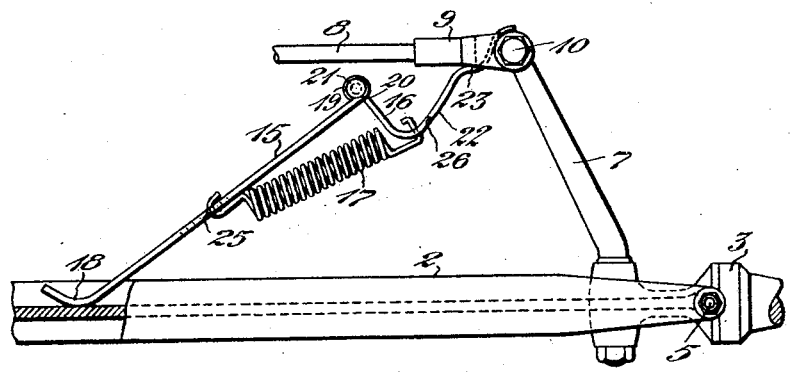
Fig. 2 is an enlarged plan view showing one end of the front axle and the steering connections with the improved device illustrated as applied to use therewith.
Figure 3:
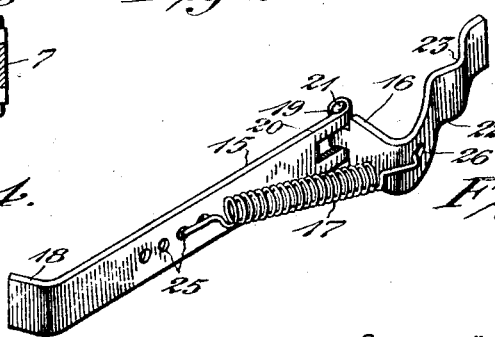
Fig. 3 is a perspective view of the improved device.

The construction of the present improved stabilizing device is shown in general in Fig. 3 as comprising two hinged members 15 and 16 adapted to operate under the tension of a helical spring 17. The main arm 15 consists of a substantially straight length of flat strip metal having an angularly bent portion 18 at one end, and formed with a forked hinge-joint 19 at its opposite end. The other arm 16 is provided with a hinge-joint 20 fitting between the forked hinge 19 and pivoted thereto by means of a hinge-pin 21. The main portion of the arm 16 normally stands at right-angles to the arm or member 15 with an extension 22 bent around to project forwardly therefrom. The extension 22 has a double bend at its end, the terminal portion of which is adapted for insertion through the opening in the forked bearing 9 on the tie-rod 8 to bear against the rounded end of the steering-arm 7 as most clearly shown in Figs. 2 and 4. The offset portion 23 of the arm 16 is thus caused to bear against the hollow of the fork in the bearing-member 9 with a prying action in the manner and for the purpose as hereinafter more fully explained.

When the device is applied to the steering-gear its straight arm 15 extends at an angle to the axle 2 with its bent end 18 bearing against the web thereof, see Fig. 2, and retained in place between the top and bottom flanges of the I-beam. In the arm 15 are a series of holes 25 adapted to receive the hooked end of the spring 17, the opposite end thereof being hooked through a slot 26 adjacent the bend in the arm 16. The plurality of holes 25 provide for adjusting the spring 17 to regulate its tension and thereby the force of its pull on the arms 15 and 16.

It will be observed that the improved device may be readily applied to use as illustrated in Figs. 1 and 2 by simply inserting the bent or curved end 22 of its arm 16 between the sides of the fork on the bearing-member 9 and then placing the end of its arm 15 against the rear of the axle 2 to be held in place between the flanges of the I-beam. With the device attached to the steering-gear in this manner the spring 17 tends to draw the arms 15 and 16 togther, thereby exerting a prying action between the forked bearing-member 9 and the ends of the steering-arm 7 while also exerting frictional pressure of the arm 15 against the axle 2. This double action causes the arm 16 to hold the tie-rod 8 in firm connection with the steering-arm 7 to eliminate lost motion between the bearing 9 and the bolt 10 so as to prevent play and rattling, and also to provide a steadying effect on the steering-knuckles 3.

In operation, as the steering-wheel is turned to operate through the drag-link 11 and tie-rod 8 to swing the steering-arms 7, whereby to turn the steering-knuckles 3 on their pivots, the arm 15 will be slid along the axle 2 in one direction or the other as the case may be. It has been explained that the tension of the spring 17 causes the arm 15 to bear frictionally against the web of the axle 2 so that as it slides therealong the device applies a slight frictional resistance to the turning action of the steering-knuckles. This resistance is hardly appreciable but has an important function in resisting the wobbling of the steering-knuckles and "shimmying" of the wheels 4 under road shocks on the tires. Stated another way, the device functions to hold the steering-knuckles against unwarranted movement to check the shimmying action of the wheels, and also as a tightener between the joints of the steering-gear to eliminate lost motion and rattle.

It will be observed that the improved device is extremely simple in construction and economical to manufacture while being most convenient to attach without the use of tools or of added parts such as screws, bolts, nuts or the like.

While I have shown the improved device as embodied in a preferred form of construction it is to be understood that various modifications may be made in the form and arrangement of its parts without departing from the spirit or scope of the invention.

Therefore, without limiting myself in this respect, I claim:

1. In a device of the type specified the combination of an arm adapted for insertion through the forked end of the tie-rod of an automobile steering-gear to bear against the end of the steering-arm connected thereto, a second arm pivoted to the first arm and adapted to bear against the front axle of the automobile, and a spring connected at opposite ends to the arms.

2. In a device of the type specified the combination with the steering-gear of an automobile comprising the front axle, steering-knuckles pivoted thereto, steering-arms on said knuckles and a tie-rod having forked end-bearings connecting it to the steering-arms, of a stabilizing device comprising a pair of hingedly connected arms arranged with the end of one arm inserted through the forked bearing connecting the tie-rod and the end of the steering-arm and the end of the other arm bearing against the front axle, and a spring extending between the arms to cause them to exert pressure on the steering-arm to control its movement.

3. A device of the type specified comprising an arm having its end adapted to be held between the I-beam flanges of the front axle of a motor car and provided with a hinged joint at its opposite end, a second arm pivotally joined to the hinge of the first arm to project at right-angles thereto and having an extension bent around and terminating in a curved portion adapted for insertion through the forked end of the tie-rod which connects it to the steering-arm, and a spring extending between the first arm and the bent portion of the second arm in the manner and for the purpose substantially as described.

4. A device of the type specified comprising a substantially straight arm having a hinge-joint at one end and a series of holes disposed at a distance therefrom, a second arm having a hinge-joint connected to the joint on the first arm, the main portion of said second arm standing at substantially right-angles to the first arm and provided with an extension bent around to project forwardly therefrom, and a spring connected at one end to the second arm and adapted to be hooked into one of the holes in the first arm.

5. A stabilizing and anti-rattling device for the steering-gear of automobiles comprising an arm adapted for connection to the end of the steering-arm of the automobile, a second arm pivoted to the opposite free end of the first arm and extending therefrom to the front axle of the car, and a spring acting between the arms to cause the second arm to bear frictionally against the axle.

In testimony whereof I affix my signature.

JOHN F. CAVANAGH.